United States Patent [19]

Weide et al.

[11] Patent Number: 5,591,257
[45] Date of Patent: Jan. 7, 1997

[54] PIGMENT PREPARATIONS BASED ON MONOAZO PIGMENTS

[75] Inventors: Joachim Weide; Rüdiger Jung, both of Kelkheim; Hans J. Metz, Darmstadt, all of Germany

[73] Assignee: Hoechst Aktiengesellschaft, Germany

[21] Appl. No.: 559,572

[22] Filed: Nov. 16, 1995

[30] Foreign Application Priority Data

Nov. 17, 1994 [DE] Germany .................. 44 40 928.1

[51] Int. Cl.⁶ ........................ C09B 29/20; C09D 11/02
[52] U.S. Cl. ............... 106/496; 106/506; 106/20 R
[58] Field of Search ........................... 106/496, 506, 106/20 R, 23 K

[56] References Cited

U.S. PATENT DOCUMENTS

| | | | |
|---|---|---|---|
| 3,360,479 | 12/1967 | Hausermann et al. | 252/301.2 |
| 3,725,101 | 4/1973 | Kuhne et al. | 106/496 |
| 3,759,731 | 9/1973 | Kuhne et al. | 106/496 |
| 3,759,733 | 9/1973 | Bradley et al. | 106/496 |
| 3,775,148 | 11/1973 | Bradley | 106/496 |
| 4,334,932 | 6/1982 | Roueche | 106/496 |
| 4,474,609 | 10/1984 | Ehl et al. | 106/496 |
| 4,720,304 | 1/1988 | Ruff et al. | 106/496 |
| 4,737,581 | 4/1988 | Hari | 106/496 |
| 5,352,281 | 10/1994 | Weide et al. | 106/496 |

FOREIGN PATENT DOCUMENTS

| | | |
|---|---|---|
| 0012944 | 6/1982 | European Pat. Off. . |
| 0176857 | 7/1989 | European Pat. Off. . |
| 2122521 | 12/1971 | Germany . |
| 2012153 | 12/1971 | Germany . |
| 2135468 | 2/1972 | Germany . |
| 2012152 | 8/1973 | Germany . |
| 2263912 | 8/1993 | United Kingdom . |

OTHER PUBLICATIONS

Database WPI, Section Ch. Week 9508, Derwent Publications Ltd., London, GB; Class A82, AN 95–057392, May/1993.

Primary Examiner—Helene Klemanski
Attorney, Agent, or Firm—Connolly & Hutz

[57] ABSTRACT

Pigment preparations comprising
a) at least one monoazo pigment of the formula (I)

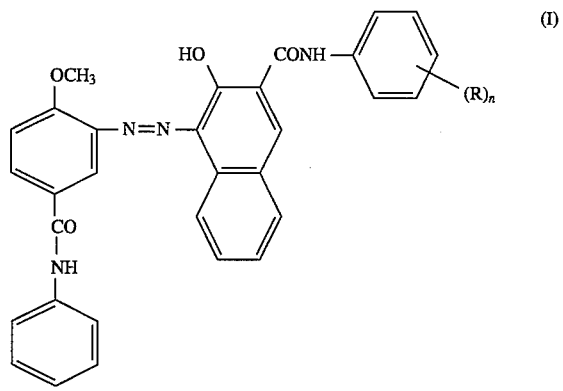

in which
R is identical or different at each occurrence and is $C_1$–$C_3$-alkyl, $C_1$–$C_3$-alkoxy, chlorine or hydrogen, and
n is a number from 1 to 3, b) at least one compound of the formula (II)

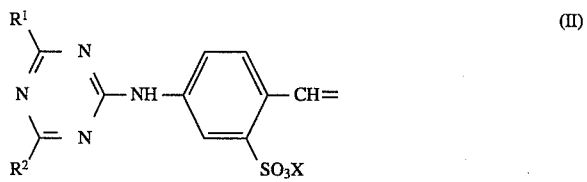

in which
$R^1$ and $R^2$ are identical or different and are a radical of the formula

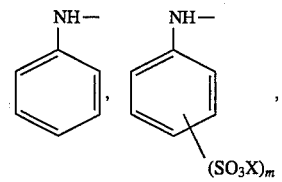

$(HOCH_2CH_2)_2N-$, $HOCH_2CH_2NH-$ or a five- to seven-membered, saturated or unsaturated, aliphatic or aromatic heterocyclic ring which includes from 1 to 3 heteroatoms from the group consisting of nitrogen, oxygen and sulfur,
m is the number 1 or 2, and
X is hydrogen, an alkali metal or a stoichiometric equivalent of an alkaline earth metal;
and, if desired,
c) further, conventional constituents and additives are particularly suitable for the production of printing inks.

10 Claims, No Drawings

PIGMENT PREPARATIONS BASED ON MONOAZO PIGMENTS

The present invention relates to the field of monoazo pigment preparations.

It is known that the technical color properties of pigments in various binders can be improved by adding dyes which contain acid groups.

For instance, U.S. Pat. No. 3,725,101 discloses mixtures of pigments with two or more dyes, in which some of the dyes contain polar groups such as carboxyl, sulfo, carbamoyl or sulfamoyl groups. The proportion of these acidic dyes may be from 0.5 to 20 mol %, preferably from 1 to 5 mol %.

U.S. Pat. No. 3,759,733 discloses pigment preparations comprising coupling products of diazotized anilines and acetoacetylamides, which preparations comprise a water-soluble dye based on the coupling product. The proportion of soluble dye may be from 0.1 to 20% by weight, based on the preparation.

U.S. Pat. No. 3,759,731 describes a process for the preparation of mixtures of disazo pigments, according to which tetrazotized 3,3'-dichloro-4,4'-diaminobiphenyl is coupled in a ratio of 1:2 mol with a mixture comprising one or two different nonpolar and one or two different polar coupling components of the acetoacetarylide or 1-aryl-5-pyrazolone series. The polar components carry one or two carboxyl and/or sulfo groups. The proportion of polar coupling components is from 0.5 to 20 mol %.

From U.S. Pat. No. 3,775,148, modified diarylide pigments are known which comprise, in addition to the pigment based on 4,4'-diaminobiphenyl with acetoacetarylide, 1-phenyl-3-methyl-5-pyrazolone or 2-hydroxy-naphthalene-3-carboxanilide, up to 25% by weight of a water-soluble dye on the same basis.

Furthermore, U.S. Pat. No. 4,474,609 describes mixtures of monoazo pigments which are obtained by coupling diazotized anilines onto acetoacetarylamides, using more than one diazo and/or coupling component, where from 0.1 to 20 mol % of the diazo and/or coupling components contain acid groups and, in the coupling product, the reactive acid groups are reacted with quaternary cationic compounds.

U.S. Pat. No. 4,720,304 describes azo pigment preparations which in addition to the constituents normally present in pigment preparations also contain from 0.2 to 10% of dyes which possess an (imidazolyl)methyl substituent.

In all of the abovementioned documents, a modified colorant is employed in order to improve the applications-related and color properties of the pigments. However, the colorant additives employed are not effective with all classes of azo pigment, and the scope for their use is limited owing to their intrinsic color.

The object of the present invention was to find colorless compounds and to use them to develop azo pigment preparations which show improvement in their rheological, print and color properties.

It has been found that this object can surprisingly be achieved by the addition of N,N'-bis(triazinyl)-4,4'-diaminostilbene-2,2'-disulfonic acid derivatives to monoazo pigments of the formula (I) below.

The present invention provides a pigment preparation comprising a) at least one monoazo pigment of the formula (I)

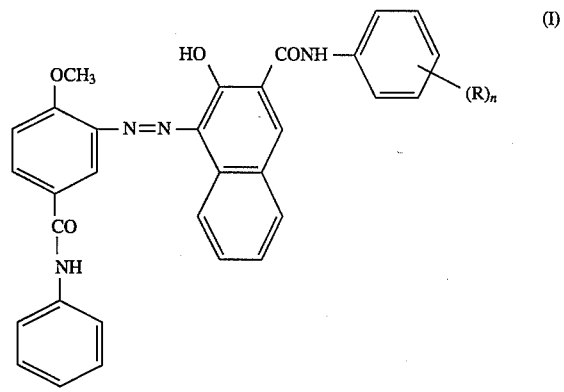

in which

R is identical or different at each occurrence and is $C_1$–$C_3$-alkyl, $C_1$–$C_3$-alkoxy, chlorine or hydrogen, and n is a number from 1 to 3, b) at least one compound of the formula (II)

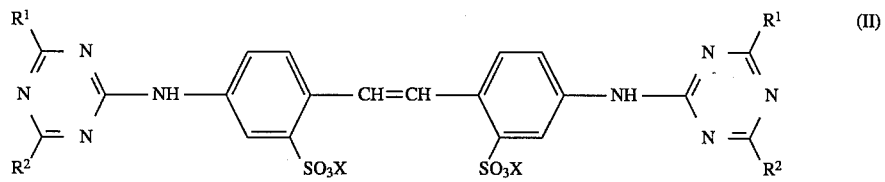

in which $R^1$ and $R^2$ are identical or different and are a radical of the formulae

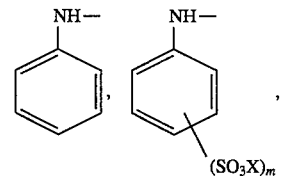

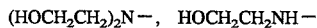

$(HOCH_2CH_2)_2N-$, $HOCH_2CH_2NH-$ a five- to seven-membered, saturated or unsaturated, aliphatic or aromatic heterocyclic ring which includes from 1 to 3 heteroatoms from the group consisting of nitrogen, oxygen and sulfur, m is the number 1 or 2, and X is hydrogen, an alkali metal or a stoichiometric equivalent of an alkaline earth metal;

and additionally comprising, if desired, c) further, conventional constituents and additives.

Among the pigment preparations described above, preference is given to those in which R is identical or different at each occurrence and is hydrogen, methyl, ethyl, methoxy, ethoxy and chlorine, $R^1$ and $R^2$ are identical or different and are a radical of the formula

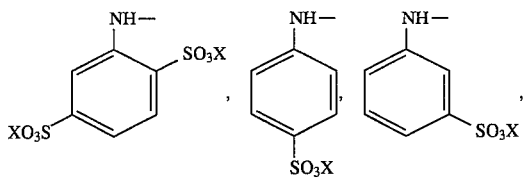

$HOCH_2CH_2NH-$, or a morpholinyl, 1-piperidyl, 1-pyrrolidinyl or 1-pyrrolyl radical, preferably a 1-morpholinyl radical, and X is hydrogen, Na or K.

Among the pigment preparations described above, particular preference is given to those in which the monoazo pigment has the structure of the formula (Ia)

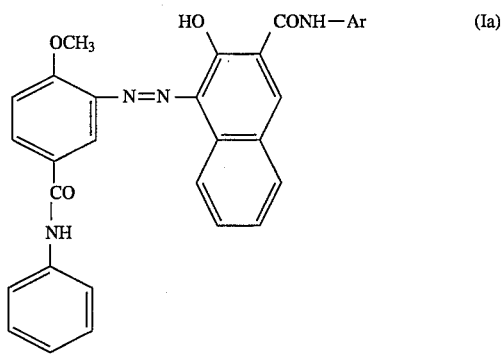

in which Ar is

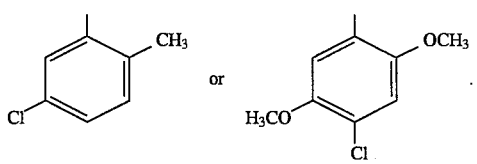

Also particularly preferred are pigment preparations as described above in which the N,N'-bis(triazinyl)-4,4'-diaminostilbene-2,2'-disulfonic acid derivative has the formula (IIa)

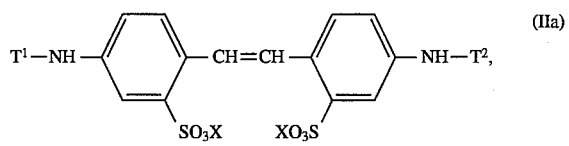

in which $T^1$ and $T^2$ are identical or different, preferably identical, and are

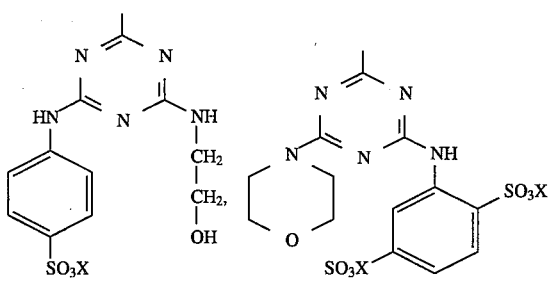

or

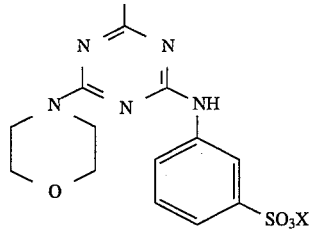

and X is hydrogen or Na.

The said diaminostilbene derivatives are employed in the trans configuration.

The proportion of component b) in the pigment preparation according to the invention is advantageously from 0.1 to 8% by weight, preferably from 0.4 to 3% by weight, based on the weight of the pigment preparation (100% by weight).

Further, conventional constituents and additives c) are, for example, resins such as rosin or rosin derivatives, for example hydrogenated, dehydrogenated, dis-proportionated or polymerized rosin, tall resins and further conventional dispersion auxiliaries. The proportion of component c) is between 0 and 30% by weight, preferably from 0. 1 to 20% by weight, of the overall weight of the pigment preparation. The monoazo pigment of formula (I) is present in an amount of 62 to 99.9% by weight, preferably from 77 to 99.5% by weight.

The invention also provides a process for the production of said pigment preparation, which comprises carrying out the coupling reaction to prepare the monoazo pigment of the formula (I) or (Ia) in the presence of component b), or combining component b), after the end of the coupling reaction, with the aqueous pigment suspension or with a filter cake of the monoazo pigment suspended in water. In the former procedure, component b) is added to the coupling component and/or to the diazo component prior to coupling, or component b) is added during the coupling reaction in the form of an aqueous suspension or solution. It is preferred to add component b) to the aqueous neutralized pigment suspension, after the end of the coupling reaction, in an aqueous suspension or solution and to heat the mixture to a temperature of from 20° to 150° C., in which case the pigment properties undergo modification in an advantageous manner (finish treatment). The preparation is then worked up in a conventional manner and is advantageously isolated as a powder. The addition of component c) can be made at any point in time during the process steps described above.

The monoazo pigments of the formulae (I) and (Ia) are prepared in a conventional manner which is entirely familiar to the person skilled in the art, by azo coupling of diazotized 3-amino-4-methoxybenzanilide (diazo component) with an N-phenyl-3-hydroxy-2-naphthalenecarboxamide (coupling component). The pigments of this type are described, for example, in W. Herbst, K. Hunger, Industrielle Organische Pigmente [Industrial organic pigments], VCH-Verlag, 1987.

The N,N'-bis(triazinyl)-4,4'-diaminostilbene-2,2'-disulfonic acid derivatives of the formula (II) are prepared by conventional methods, for example by reacting 4,4'-diaminostilbene-2,2'-disulfonic acid with 2 mol equivalents of cyanuric chloride and with from 2 to 4 mol equivalents of the amine corresponding to the radicals $R^1$ and/or $R^2$, as described in DE-A-1 206 296 and BE-A-569 912.

The compounds of the formulae (I) and (Ia) used in the preparations according to the invention have no intrinsic color and cause no unwanted shifts in shade and no impairment of the cleanness of shade. The good solvent fastness properties of the monoazo pigments of the formulae (I) and (Ia) which are used, however, are retained in the pigment preparation according to the invention.

The pigment preparations according to the invention are particularly suitable for the production of printing inks, and exhibit outstanding properties with regard to the criteria which are important for pigments for printing inks, namely transparency, gloss and tinctorial strength.

Particular preference is given to the use of the pigment preparations according to the invention for the production of solvent-containing intaglio and flexographic printing inks, and of their water-based counterparts.

The invention also provides for the use of the pigment preparations according to the invention to produce printing inks.

In the examples below, parts are by weight, and the relationship between parts by volume and parts by weight is that of the liter to the kilogram.

EXAMPLE 1

193.6 parts of 3-amino-4-methoxybenzanilide are stirred with 2000 parts by volume of water and 360 parts by volume of 31% strength hydrochloric acid for 15 minutes, and adjusted to 10° C. with ice. Then 112 parts by volume of a 38% strength solution of sodium nitrite are run in below the surface over the course of 5 minutes. Stirring is resumed at from 10° to 15° C. for 1 hour. The resulting diazonium solution is clarified by filtration, and the excess nitrite is destroyed using amidosulfonic acid.

205.6 parts of N-(5-chloro-2-methylphenyl)-3-hydroxy-2-naphthalenecarboxamide and 58.4 parts of N-(4-chloro-2,5-dimethoxyphenyl)-3-hydroxy-2-naphthalenecarboxamide are dissolved in 1600 parts by volume of water and 264 parts of a sodium hydroxide solution having a density of 1.35, and this solution is run over the course of 30 minutes at from 0° to 10° C. into a solution, cooled to 0° C. with ice, of 154.4 parts of glacial acetic acid and 16 parts of an alkyl polyglycol ether (®Genapol T 250) in 1600 parts by volume of water, a pH of from 5.6 to 6.0 being established at the end of precipitation. The mixture is subsequently stirred for 30 minutes, and 46 parts of a 30% strength aqueous solution of cocoalkyldimethylamine oxide and 40 parts of sodium acetate are added to the precipitate.

The diazonium solution is then run in below the surface of the precipitated coupling component at from 40° to 45° C. over the course of 90 minutes, in the course of which a pH of from 3.5 to 4.0 is established. Toward the end of coupling, diazo excess occurs, but disappears in the course of subsequent stirring at 70° C. for 30 minutes. When coupling is at an end, 24 parts of a $C_{12}$–$C_{15}$ fatty alcohol-ethylene oxide-propylene oxide adduct (comprising 1 mol of alcohol, 8 mol of ethylene oxide and 4 mol of propylene oxide) and 5.5 parts of a stilbenedisulfonic acid derivative of the following formula

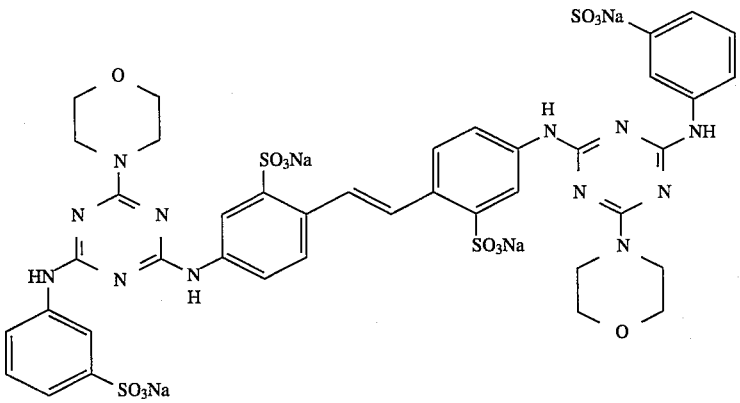

dissolved in 200 parts by volume of water, are added and stirring is carried out subsequently for 30 minutes. The mixture is then filtered hot and the solid product is washed with hot water at 50° C. Drying at 70° C. and grinding give 518 parts of a red pigment powder.

Using the above-prepared pigment preparation to produce a solvent-containing nitrocellulose intaglio printing ink, and assessing the prints produced therewith against a printing ink based on a corresponding pigment preparation but without the use, according to the invention, of the stilbenedisulfonic acid compound, the pigment preparation produced in accordance with Example 1 exhibits higher tinctorial strength coupled with markedly higher transparency and markedly higher gloss.

EXAMPLE 2

A diazonium solution is prepared as described in Example 1.

290.7 parts of N-(4-chloro-2,5-dimethoxyphenyl)-3-hydroxy-2-naphthalenecarboxamide are dissolved in 1600 parts by volume of water and 264 parts of a sodium hydroxide solution having a density of 1.35, and this solution is run at from 0° to 10° C. over the course of 30 minutes into a solution, cooled to 0° C. with ice, of 33.6 parts of glacial acetic acid, 151 parts by volume of 31% strength hydrochloric acid and 13.3 parts of an alkyl polyglycol ether (®Genapol T 250) in 1600 parts by volume of water, a pH of from 4.5 to 5.6 being established at the end of precipitation.

The diazonium solution is then run in below the surface of the precipitated coupling component at from 40° to 45° C. over the course of 90 minutes, the pH being maintained at between 5.2 and 5.0 by running in a 6% strength sodium hydroxide solution. Toward the end of coupling, diazo excess occurs, but disappears in the course of subsequent stirring for 30 minutes.

When coupling is at an end, 24 parts of a $C_{12}$–$C_{15}$ fatty alcohol-ethylene oxide-propylene oxide adduct, 16.2 parts of a 30% strength aqueous solution of cocoalkyldimethylamine oxide and 1.9 parts of a stilbenedisulfonic acid derivative of the following formula

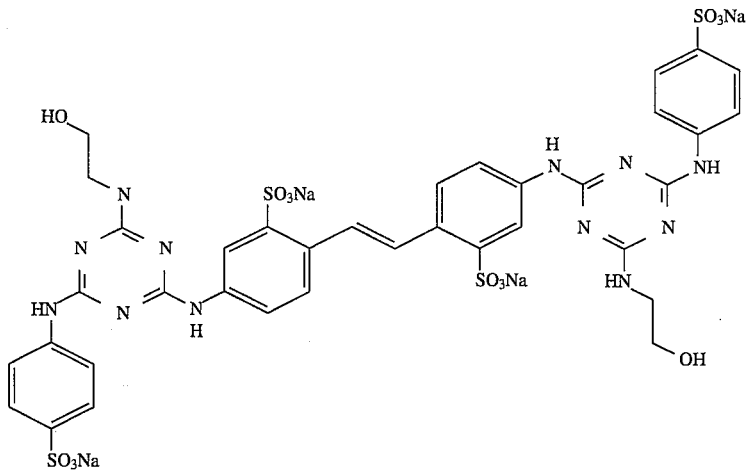

dissolved in 200 parts by volume of water, are added, and stirring is carried out subsequently for 30 minutes. The mixture is then heated to 60° C. and filtered hot, and the solid product is washed with hot water at 50° C. Drying at 70° C. and grinding give 530 parts of a red pigment powder.

Using the above-prepared pigment preparation to produce a solvent-containing nitrocellulose intaglio printing ink, and assessing the prints produced therewith against a printing ink based on a corresponding pigment preparation but without the use, according to the invention, of the stilbenedisulfonic acid compound, the pigment preparation produced in accordance with Example 2 exhibits higher tinctorial strength coupled with markedly higher transparency and markedly higher gloss.

EXAMPLE 3

A diazonium solution is prepared as described in Example 1.

249.2 parts of N-(5-chloro-2-methylphenyl)-3-hydroxy-2-naphthalenecarboxamide are dissolved at 95° C. in 1600 parts by volume of water and 217 parts of a sodium hydroxide solution having a density of 1.35, and the solution is cooled to 50° C. with ice and run at from 0° to 10° C. over the course of 30 minutes into a solution, cooled to 0° C. with ice, of 128 parts of glacial acetic acid and 16 parts of an alkyl polyglycol ether (®Genapol T 250) in 3200 parts by volume of water, a pH of from 5.5 to 6.5 being established at the end of precipitation.

The diazonium solution is then run in below the surface of the precipitated coupling component at from 40° to 45° C. over the course of 2 hours; toward the end of coupling, diazo excess occurs, but disappears in the course of subsequent stirring for 15 to 30 minutes. When coupling is at an end, 5.2 parts of a stilbene-disulfonic acid derivative of the following formula

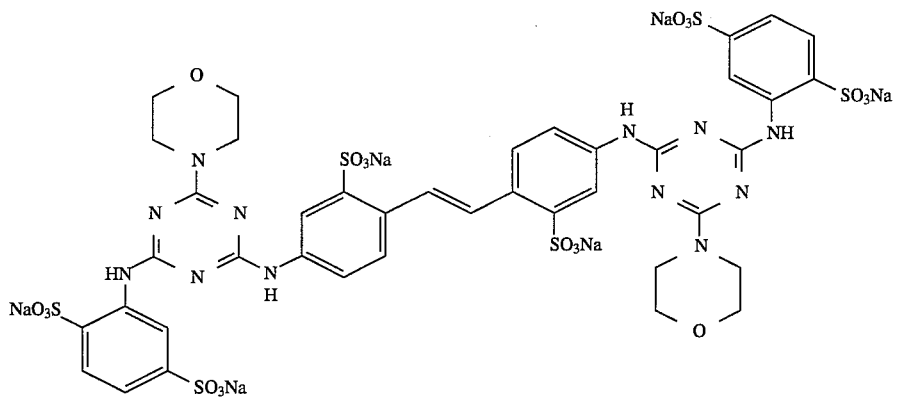

dissolved in 200 parts by volume of water, are added, and stirring is carried out subsequently for 30 minutes. It is then filtered and the solid product is washed free of salt using water. Drying at 65° C. and grinding give 450 parts of a red pigment powder.

Using the above-prepared pigment preparation to produce a solvent-containing nitrocellulose intaglio printing ink, and assessing the prints produced therewith against a printing ink based on a corresponding pigment preparation but without the use, according to the invention, of the stilbenedisulfonic acid compound, the pigment preparation produced in accordance with Example 3 exhibits higher tinctorial strength coupled with markedly higher transparency and markedly higher gloss.

EXAMPLE 4

Following the procedure of Example 1 and replacing the stilbenedisulfonic acid compound employed by that used in Example 2, a pigment is obtained which has the same good color properties as described in Example 1.

EXAMPLE 5

Following the procedure of Example 1 and replacing the stilbenedisulfonic acid compound employed by that used in EXAMPLE 3, a pigment is obtained which has the same good color properties as described in Example 1.

The pigment preparations from the preceding examples are processed by the procedure described below to give printing inks, which are used in turn to produce prints.

Production of intaglio printing inks in a paint shaker and subsequent application to a print medium.

1. Varnish

| | |
|---|---|
| 30.0% | of collodion wool A 400 (65% ethanol moist) |
| 4.0% | of plasticizer, for example ® Genomoll 140 (dibutyl phthalate) |
| 8.0% | of methoxypropanol |
| 58.0% | of ethanol (anhydrous) |
| 100.0% | (solids content 23.5%) |

2. Solvent mixture:

50% of ethanol
50% of ethyl acetate
Sample and comparison are each made into 2 inks by the following method:
A 150 ml plastic cup with a push-on lid is filled with 113 g of glass balls (2 mm diameter) and

| | |
|---|---|
| 5.4 g | of pigment |
| 15.0 g | of nitrocellulose (NC) varnish (1.) |
| 15.6 g | of the solvent mixture (2.) |
| 36.0 g | (15% strength millbase). |

2 cups each of sample and comparison are dispersed simultaneously on the shaker device for 30 minutes.

3. Each cup of sample and comparison is then supplemented with 9.0 g of NC varnish (1.)

and further shaken for 2 minutes on the shaker device These now 12% strength concentrates are introduced via a sieve into a glass bottle and used for measuring the viscosity.

4. The remaining two cups of sample and comparison are each supplemented with 32.0 g of NC varnish (1.) and 4.0 g of methoxypropanol and shaken for a further 2 minutes. These now 7.5% strength ready-prepared printing inks are separated from the glass balls and introduced into a glass bottle. Before printing, the ink is left to stand for 10 minutes to allow air bubbles to escape.

5. Printing

The above-described 7.5% strength printing inks are printed with an intaglio test printing press once on paper and once on polypropylene (PP) film, with the sample and the comparison being printed side by side on the same print medium.

Each print is placed immediately after printing, for some seconds, onto a hot plate at 60° C. to prevent blushing of the print.

6. Viscosity measurement

The viscosity is measured on the above-described 12% strength concentrates (using for example a Rotovisko RV3 or RV1 2 or a Viskotester VT 500 from Haake, Karlsruhe).

7. Assessment

The print on paper is used to assess tinctorial strength, shade and cleanness and—from the print on top of black— the transparency.

The print on the PP film (underlaid with paper) or aluminum foil is used to assess gloss and transparency.

If the tinctorial strength of the two inks differs by more than 5%, the stronger ink (sample or comparison) is reduced appropriately with varnish (1.) (for example to 95 parts, 90 parts, etc.) and is again printed against the 2nd ink.

We claim:

1. A pigment preparation comprising a) at least one monoazo pigment of the formula (I)

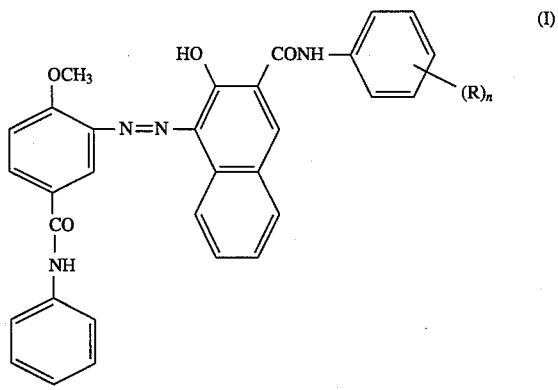

in which

R is identical or different at each occurrence and is $C_1$–$C_3$-alkyl, $C_1$–$C_3$-alkoxy, chlorine or hydrogen, and n is a number from 1 to 3, b) at least one compound of the formula (II)

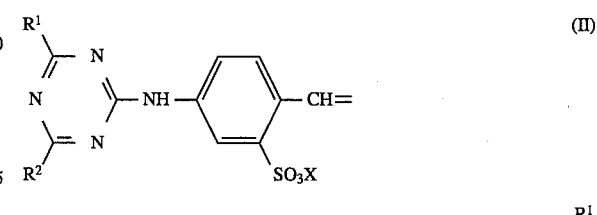

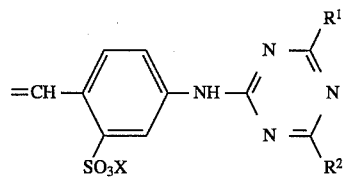

in which

R$^1$ and R$^2$ are identical or different and are a radical of the formula

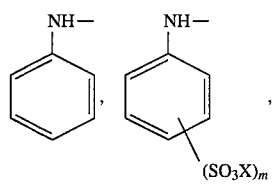

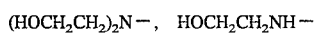

or a five- to seven-membered, saturated or unsaturated, aliphatic or aromatic heterocyclic ring which includes from 1 to 3 heteroatoms from the group consisting of nitrogen, oxygen and sulfur, m is the number 1 or 2, and X is hydrogen, an alkali metal or a stoichiometric equivalent of an alkaline earth metal;

and, optionally, c) further, conventional constituents and additives.

2. A pigment preparation as claimed in claim 1, wherein

R is identical or different at each occurrence and is hydrogen, methyl, ethyl, methoxy, ethoxy or chlorine, R$^1$ and R$^2$ are identical or different and are a radical of the formula

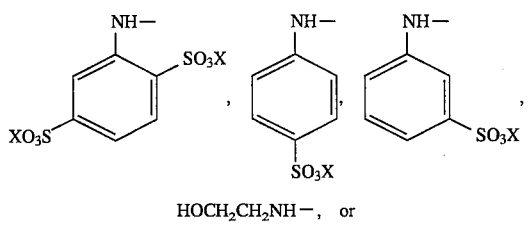

HOCH$_2$CH$_2$NH—, or a morpholinyl, 1-piperidyl, 1-pyrrolidinyl or 1-pyrrolyl radical and X is hydrogen, Na or K.

3. A pigment preparation as claimed in claim 1, wherein the monoazo pigment has the structure of the formula (Ia)

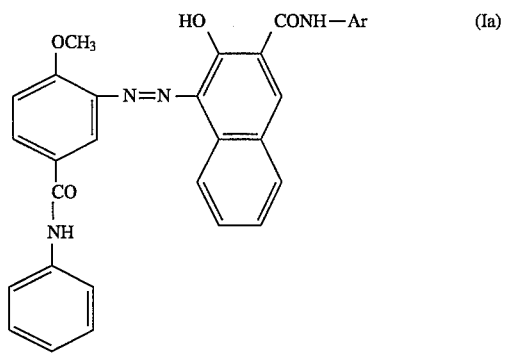

in which Ar is

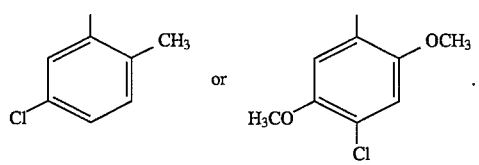

4. A pigment preparation as claimed in claim 1, wherein component b) is a compound of the formula (IIa)

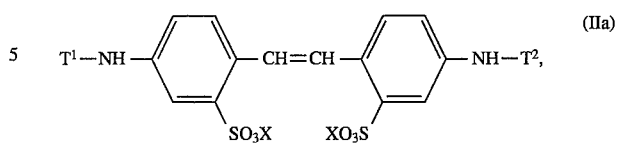

in which T$^1$ and T$^2$ are identical or different, and are

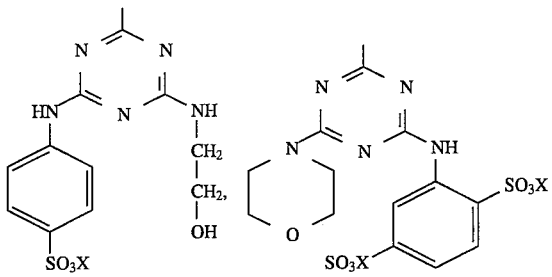

or

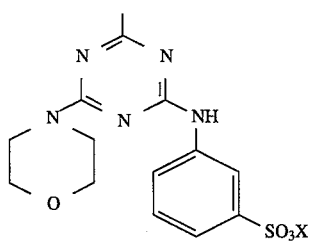

and X is hydrogen or Na.

5. A pigment preparation as claimed in claim 1, wherein the proportion of component b) is from 0.1 to 8% by weight, based on the weight of the pigment preparation (100% by weight).

6. A pigment preparation as claimed in claim 1, wherein the proportion of component b) is from 0.4 to 3% by weight, based on the weight of the pigment preparation (100% by weight).

7. A process for producing a pigment preparation as claimed in claim 1, which comprises carrying out a coupling reaction, in a reaction mixture, to prepare the monoazo pigment of the formula (I) or (Ia) in the presence of component b), or combining component b), after the end of the coupling reaction, with the aqueous pigment suspension or with a filter cake of the monoazo pigment suspended in water.

8. The process as claimed in claim 7, wherein the reaction mixture is heated after the end of the coupling reaction at a temperature of from 20° to 150° C.

9. A method of pigmenting printing inks comprising the step of incorporating a pigment preparation as claimed in claim 1 into said printing inks.

10. The method as claimed in claim 9, wherein the printing inks are solvent-containing or aqueous intaglio or flexographic printing inks.

* * * * *